United States Patent
Meyer-Gräfe et al.

(10) Patent No.: US 7,152,188 B1
(45) Date of Patent: Dec. 19, 2006

(54) CIRCUIT ARRANGEMENT FOR PROTECTED DATA TRANSMISSION, PARTICULARLY IN RING-SHAPED BUS SYSTEMS

(75) Inventors: Karsten Meyer-Gräfe, Hövelhof (DE); Thorsten Behr, Meinberg (DE); Wolfram Kress, Siegburg (DE); Peter Wratil, Rosengarten (DE)

(73) Assignee: Phoenix Contact GmbH & Co., Blomberg (DE)

( * ) Notice: Subject to any disclaimer, the term of this patent is extended or adjusted under 35 U.S.C. 154(b) by 373 days.

(21) Appl. No.: 10/009,444

(22) PCT Filed: Jun. 5, 2000

(86) PCT No.: PCT/DE00/01796

§ 371 (c)(1),
(2), (4) Date: May 9, 2002

(87) PCT Pub. No.: WO00/76136

PCT Pub. Date: Dec. 14, 2000

(30) Foreign Application Priority Data

Jun. 4, 1999 (DE) ................................ 199 25 693

(51) Int. Cl.
*G06F 11/00* (2006.01)

(52) U.S. Cl. ..................... 714/43; 714/47; 700/108

(58) Field of Classification Search ........... 714/47, 714/43, 717, 746, 727; 710/15, 59; 700/26, 700/108
See application file for complete search history.

(56) References Cited

U.S. PATENT DOCUMENTS

| | | | |
|---|---|---|---|
| 5,115,177 A | | 5/1992 | Tanaka et al. |
| 5,274,546 A | | 12/1993 | Kinoshita |
| 5,361,334 A | * | 11/1994 | Cawley ...................... 709/243 |
| 5,390,188 A | * | 2/1995 | Dawson ...................... 714/717 |
| 5,425,017 A | * | 6/1995 | Copley et al. .............. 370/245 |
| 5,602,827 A | * | 2/1997 | Lindeborg et al. .......... 370/223 |
| 5,745,268 A | * | 4/1998 | Eastvold et al. .............. 398/25 |
| 6,385,562 B1 | * | 5/2002 | Roth et al. ................... 702/188 |
| 6,466,539 B1 | * | 10/2002 | Kramer et al. ............... 370/216 |

* cited by examiner

*Primary Examiner*—Scott Baderman
*Assistant Examiner*—Paul Contino

(57) ABSTRACT

The present circuit arrangement allows data, which are necessary for building up fault-tolerant structures, to be transmitted on standard ring-shaped bus systems. Its implementation requires a monitoring unit and input and output units which transmit or receive data for control. The circuit arrangement handles the task of detecting any faults which can become a danger for the process within a machine or plant. Due to its internal configuration, the circuit arrangement identifies any fault even before the detection of the fault and initiates a protected switch-off. In this arrangement, it is of no importance whether it is the external control unit or the bus system used which is responsible for the fault.

16 Claims, 2 Drawing Sheets

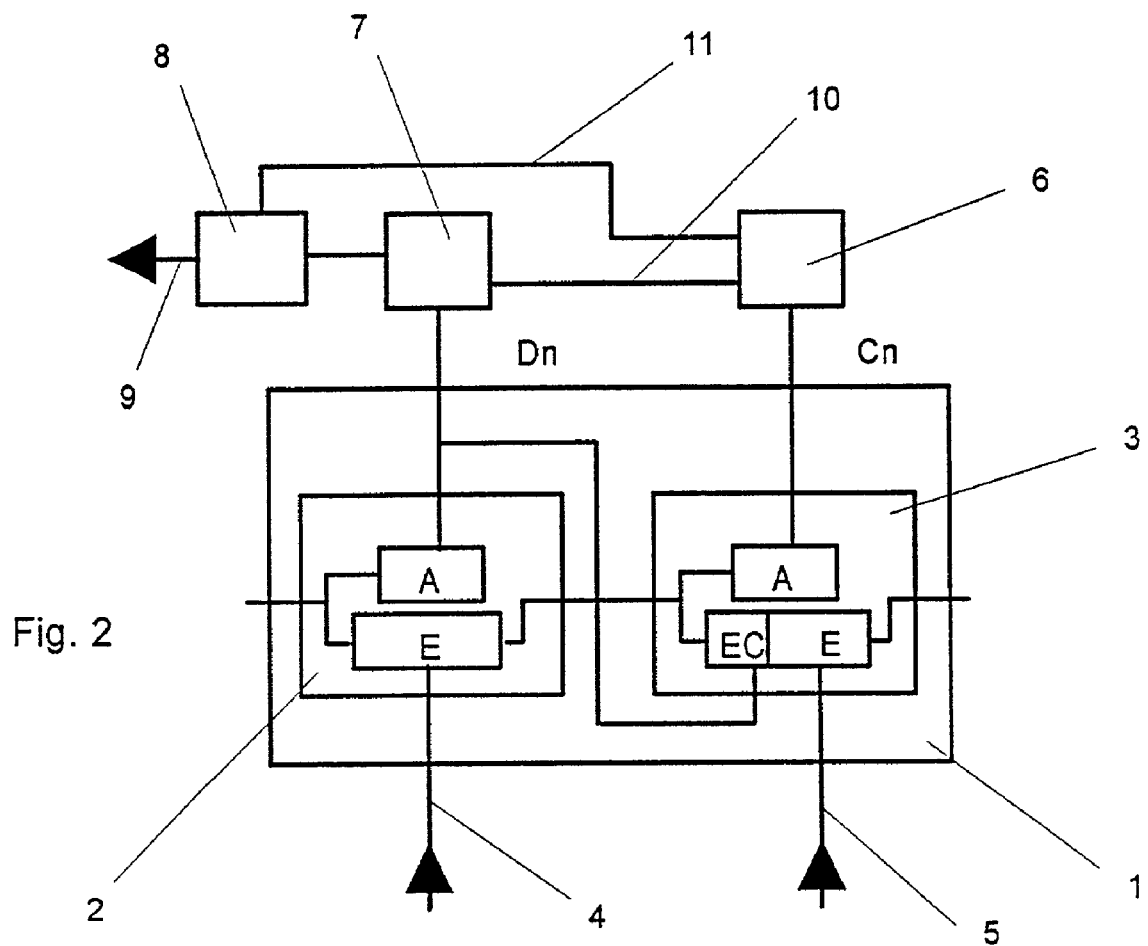

CIRCUIT ARRANGEMENT FOR PROTECTED DATA TRANSMISSION, PARTICULARLY IN RING-SHAPED BUS SYSTEMS

CROSS-REFERENCE TO RELATED APPLICATIONS

Not Applicable

STATEMENT REGARDING FEDERALLY SPONSORED RESEARCH & DEVELOPMENT

Not Applicable.

BACKGROUND OF THE INVENTION

1. Field of the Invention

The invention relates to a circuit arrangement for protected data transmission, particularly in ring-shaped bus systems.

2. Description of Relevant Art

In machine and plant construction today, movements and processes are not infrequently controlled which represent a danger to the life and health of persons, particularly the operating personnel, in the case of a fault or if they fail. Apart from these dangers, however, valuable machine parts must also be protected which can suffer great financial damage in the case of possible malfunctions.

Any faults which may occur must, therefore, be recognized by the process or the existing control facilities and the machine should always be driven in a state which can be considered safe. As a rule, redundant structures are necessary for this which monitor the safety functions independently of the actual control. In machine or plant construction, detection of a single error is frequently sufficient for fault detection. After this fault has been detected, the control process can then be interrupted and stay in a safe state. This prevents any damage by faulty continuation of the process.

The methods for fault detection and the measures necessary for these are stated in international standards DIN V VDE 0801 and DIN ISO 61508. By means of the principles given in these standards, the manufacturers of automation equipment have developed in recent years different strategies which allow safe transmissions on bus systems, see, for example, the "profibus with F-Profil, PNO and safety-bus P by Pilz and Sick.

In addition, control systems will reach the market which already have internally redundant structures and thus, in interplay with said safe-bus systems, allow fault detection; see, for example, the bus systems from Siemens, particularly the equipment series S 7 400 F, or the PSS 3000 series by Pilz.

However, the methods implemented there can only be used with completely new installation of the necessary components and protect only inadequately against systematic faults.

BRIEF SUMMARY OF THE INVENTION

Instead, the invention has the object of detecting faults in a process which is only built up with standard units.

In addition, it should preferably be not only any faults occurring in the transport of data via a bus system used, but also disturbances or programming errors in the control device which are detected and eliminated.

The circuit arrangement thus represents an implementation of a method which has already been filed under the post-published German patent application no. 198 57 683.8, the full extent of the content of which is also made the subject matter of the present patent application by reference.

The method is particularly suitable for all ring-shaped bus systems, the technology described being optimally adapted for the interbus standard. In this case, a requirement profile was already worked out at the beginning of 1999 and then published, IEE journal, April 1999, Karsten Meyer-Gräfe: "Interbus goes Safety".

BRIEF DESCRIPTION OF THE DRAWINGS

In the text which follows, the invention is described in more detail, referring to preferred embodiments and the attached drawings, in which:

FIG. 2 shows the internal configuration of the peripheral safety-related unit of the system for protected data transmission.

DETAILED DESCRIPTION OF THE INVENTION

Figure 1:
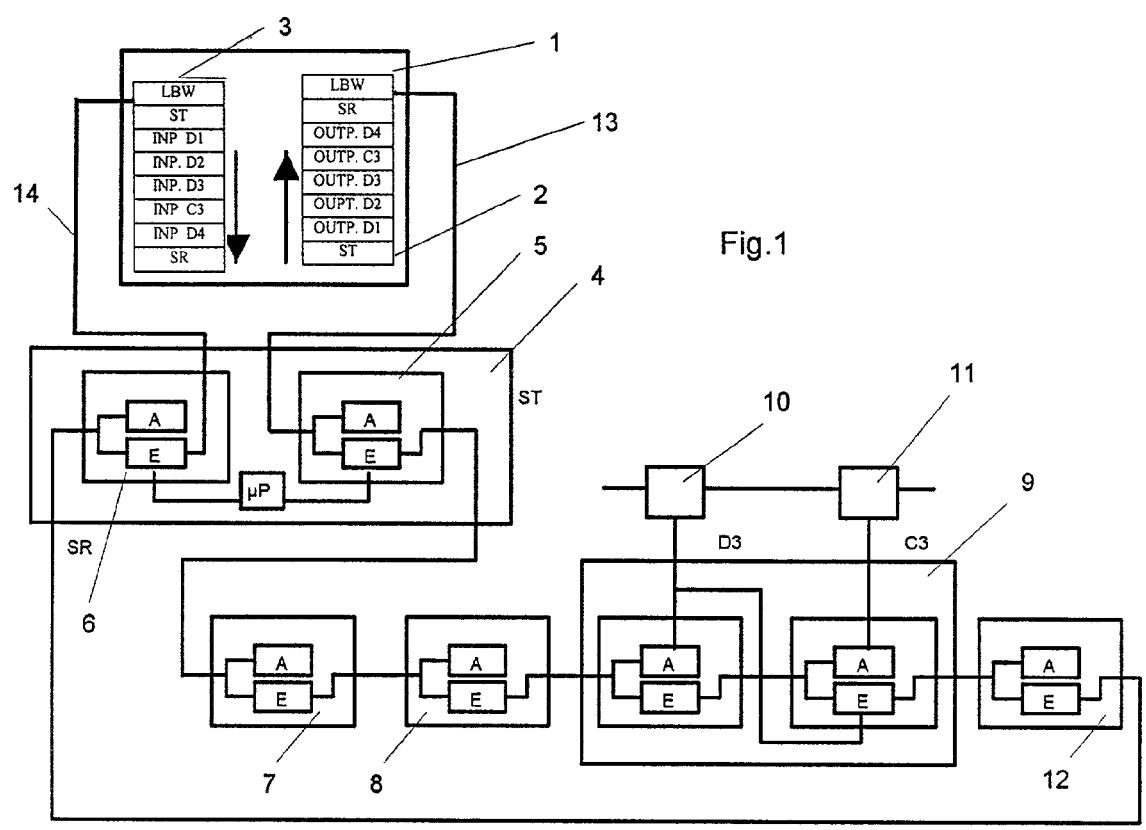
FIG. 1 shows the configuration for a first embodiment of a system for protected data transmission.

In the text which follows, the invention will be described in greater detail, initially by referring to FIG. 1. FIG. 1 shows a suitable configuration for such a system.

The control unit (1) handles all control functions in the process as is known, for example, from the conventional interbus system. The control unit (1) also detects possible faults and can interrupt processes or bring them to a safe state.

In the case of its own failure or in the case of faulty data transport, however, the control unit (1) is conventionally not able to produce the desired safe state. This failure also occurs, for example, if there is extensive separation between process control and safety control in the control system. Since there is conventionally no redundancy here, either, an undetected fault may have grave consequences.

According to the invention, other components are added which detect and eliminate a possible fault. These units are: a peripheral monitoring unit (4) and one or more peripheral safety-related units (9) in the process, which are only necessary where safety-related data are received or transmitted.

The control unit (1) contains a data map register (2) which sends all output data and other checking signals via the data line (13) to the peripheral units (7, 8, 12, peripheral safety-related unit 9 and peripheral monitoring unit 4).

Since the bus transport works in a similar way to a shift register, all peripheral units send their input data to the control unit in the same bus cycle via the return line (14) and these data are available in the data map register (3). In a subsequent SPC (stored-program control) cycle, the SPC then processes the data from its two map registers (2, 3) and thus generates the necessary state for the process.

Without the peripheral monitoring unit (4) and the peripheral safety-related unit (9), however, the SPC is not capable of controlling a programming error, a state due to disturbance or failure or a data error due to the wrong bus transport. The peripheral monitoring unit (4), therefore, contains its own microprocessor which monitors the transmitted data of the SPC and only examines the safety-related quantities for appropriateness, particularly their correctness.

Thus, the peripheral monitoring unit (4) with the transfer unit (5) is capable of monitoring the SPC. However, the peripheral monitoring unit (4) can also additionally read the data of the inputs of the peripheral units via the transfer unit (6) installed in the return path. Since the peripheral safety-related unit (9) also forwards its output information (D3) directly to the input section of the bus unit (23), it is possible to check directly whether the bus transfer has worked correctly.

Furthermore, the peripheral monitoring unit (4) with its transfer unit (5) is also capable of manipulating the data for the peripheral safety-related unit (9). In particular, the peripheral monitoring unit (4) can overwrite data of the SPC and thus prevent agreement with the data output from the peripheral safety-related unit (9). The peripheral safety-related unit (9) becomes active only if it has received an agreement for the data of the output unit (10) via the checking unit (11).

The timing with the data transport is shown in the following table:

However, the checking logic (11) additionally decides whether the information of the buffer (27) appears at the peripheral unit via the output logic (28). This checking logic (11) can either release the stored information via the line (30) or delete the state via the line (31) so that the output (29) brings the control process into a safe state.

In principle, however, the circuit arrangement operates in many areas just like a normal decentralized SPC system. The components merely additionally allow inputs to be redundantly monitored and stored output information to be examined for appropriateness, particularly freedom from faults before it is output. Furthermore, the monitoring unit can also detect faults which have not only been produced by failure or disturbance but were caused by an error in programming or parameterizing.

The present circuit arrangement thus allows data which are necessary for configuring fault-tolerant structures to be transmitted on standard ring-shaped bus systems.

| S | | ST | | 1 | | 2 | | D3 | | C3 | | 4 | | SR | |
|---|---|---|---|---|---|---|---|---|---|---|---|---|---|---|---|
| H | MT | A | E | A | E | A | E | A | E | A | E | A | E | A | E | MR |
| 0 | LBW | | ST | | E1 | | E2 | | E3 | | EC3 | | E4 | | ESR | |
| 1 | ASR | LBW | LBw | ST | ST | E1 | E1 | E2 | E2 | E3 | E3 | EC3 | EC3 | E4 | E4 | ESR |
| 2 | A4 | ASR | ASR | LBW | LBW | ST | ST | E1 | E1 | E2 | E2 | E3 | E3 | EC3 | EC3 | E4 |
| 3 | 1 | A4 | A4 | ASR | ASR | LBW | LBW | ST | ST | E1 | E1 | E2 | E2 | E3 | E3 | EC3 |
| 4 | A3 | 1 | AC3 | A4 | A4 | ASR | ASR | LBW | LBW | ST | ST | E1 | E1 | E2 | E2 | E3 |
| 5 | A2 | A3 | A3 | AC3 | AC3 | A4 | A4 | ASR | ASR | LBW | LBW | ST | ST | E1 | E1 | E2 |
| 6 | A1 | A2 | A2 | A3 | A3 | AC3 | AC3 | A4 | A4 | ASR | ASR | LBW | LBW | ST | ST | E1 |
| 7 | ST | A1 | A1 | A2 | A2 | A3 | A3 | AC3 | AC3 | A4 | A4 | ASR | ASR | LBW | LBW | ST |
| 8 | | ST | ST | A1 | A1 | A2 | A2 | A3 | A3 | AC3 | AC3 | A4 | A4 | ASR | ASR | LBW |

The timing diagram shows the state after each shift information in the ring by means of a preferred example, the Interbus system by Phoenix Contact GmbH and Co. KG.

The information AC3 can be manipulated by the peripheral monitoring unit (4) with the transfer unit (5) and can be overwritten. The peripheral safety-related unit (9) thus receives in its checking logic (11) an additional information item which prevents a faulty output.

As can also be seen from the timing diagram, the peripheral monitoring unit (4) can also read the data of the output from the peripheral safety-related unit (9) (EC3). These data represent the direct output information of the peripheral safety-related unit (9) so that a bus error is reliably detected.

The internal configuration of the peripheral safety-related unit (9) is shown in FIG. 2.

The peripheral safety-related unit (9) consists of two bus units (22, 23) so that input information can be fetched redundantly (24, 25). In addition, the output information Dn from a bus unit (22) is mapped via the input section of the other bus unit (23). A possible error in the internal storage or during the bus transport is thus detected in the subsequent cycle of the bus transport. The output information Dn is written into the buffer (27) by the control unit (SPC).

To implement the invention, a monitoring unit and peripheral input and output units transmitting or receiving data for control purposes are used.

The circuit arrangement handles the task of detecting any faults which can become a danger for the control process, particularly for the transmission of control, sensor or actuator data, within a machine or plant. Due to its internal configuration, the circuit arrangement identifies a possible error even before the error is transmitted to the control process and initiates a protected switch-off. In this arrangement, it is of no importance whether it is the external control unit or the bus system used which is responsible for the error.

The invention claimed is:

1. A system for protected data transmission in ring-shaped bus systems, comprising
    a control unit (1) which sends output data and checking signals for a control process to peripheral units (4, 7, 8, 9, 12),
    a peripheral monitoring unit (4) which has a first transfer unit (5) for monitoring the transmitted data and a second transfer unit (6) for monitoring data to be read back into the control unit (1), and at least one peripheral safety-related unit (9) for receiving or transmitting safety-related data, in which data are temporarily stored for output, which has a checking logic (11) for monitoring the temporarily stored data and an output unit (10) for outputting the temporarily stored data, the temporarily stored data being monitored by the checking logic (11) in such a manner that, in the case of a fault, a safe state of the output unit (10) for the control process is initiated, the first transfer unit (5) monitoring the data sent out by the control unit (1), in such a manner that, in the case of a fault, release data for the peripheral safety-related unit (9) are suppressed or deleted so that the faulty data do not reach the control process, particularly data transmission sequences, wherein the input data of the peripheral safety-related unit (9) and its temporarily stored data are read back via the second transfer unit (6), whereby the peripheral safety-related unit (9) reads back the temporarily stored data via a bus unit (23), whereby the peripheral safety-related unit (9) comprises a further bus unit (22) so that the peripheral safety-related unit (9) has redundant input channels (24, 25) and thus redundantly monitors the connected control process and can detect a fault.

2. The system as claimed in claim 1, characterized in that the temporarily stored data and the input data of the peripheral safety-related unit (9) are provided to the peripheral monitoring unit (4).

3. The system as claimed in claim 1, characterized in that the peripheral safety-related unit (9) has a buffer (27) which is read back by a bus unit (23) of said peripheral safety-related unit (9) and is thus checked by the peripheral monitoring unit (4) even before release to the control process, particularly of data transmitted via the bus, via the output logic (28) with the output signal (29).

4. The system as claimed in claim 1, characterized in that the checking logic (11) decides whether the data stored in the buffer (27) are output via the output logic (28).

5. The system as claimed in claim 1, characterized in that the checking logic (11) releases or deletes the temporarily stored data.

6. The system as claimed in claim 1, characterized in that the peripheral monitoring unit (4) with the first transfer unit (5) is capable of manipulating the data for the peripheral safety-related unit (9).

7. The system as claimed in claim 1, characterized in that the peripheral monitoring unit (4) overwrites data of the SPC.

8. The system as claimed in claim 1, characterized in that agreement to a data output from the peripheral safety-related unit (9) is prevented by the overwriting of the data.

9. The system as claimed in claim 1, characterized in that the checking logic (11) receives from the peripheral monitoring unit (4) an information item which prevents a faulty output.

10. The system as claimed in claim 1, characterized in that the peripheral safety-related unit (9) only becomes active if it has received an agreement for the data of the output unit (10) via the checking unit (11).

11. The system as claimed in claim 1, characterized in that the peripheral units (4, 7, 8, 9, 12) themselves can perform logic operations.

12. The system as claimed in claim 1, characterized in that the peripheral monitoring unit (4) itself handles control functions and thus a combined operation with a safety control unit is produced.

13. The system as claimed in claim 1, characterized in that the peripheral safety-related unit (9) manages with standard non-safety-related modules for the bus traffic and does not need any special safety-related modules.

14. The system as claimed in claim 1, characterized in that the system is operable in standard bus systems and is capable of operating without additional installation of further bus systems or special components.

15. The system as claimed in claim 1, characterized in that the system is installable subsequently by adding the peripheral monitoring unit (4) and exchanging normal peripheral units for peripheral safety-related units (9).

16. The system as claimed in claim 1, characterized in that the safety function of the system can also be subsequently expanded by adding hardware elements or software modules.

* * * * *